United States Patent
Tan et al.

(10) Patent No.: US 8,165,769 B2
(45) Date of Patent: Apr. 24, 2012

(54) MULTI-FACTOR SPEED ESTIMATION SYSTEM AND METHOD FOR USE

(75) Inventors: Hualin Tan, Novi, MI (US); Daniel S. Maitlen, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 511 days.

(21) Appl. No.: 12/396,022

(22) Filed: Mar. 2, 2009

(65) Prior Publication Data

US 2010/0222977 A1    Sep. 2, 2010

(51) Int. Cl.
  *G06F 17/00* (2006.01)
  *B60T 8/24* (2006.01)
(52) U.S. Cl. ............................. 701/70; 701/72
(58) Field of Classification Search .......... 701/70, 701/72; 702/96, 142, 145, 148; 73/1.37, 73/115.08, 488; D10/98; 700/55, 44
  See application file for complete search history.

(56) References Cited

U.S. PATENT DOCUMENTS

| | | | | |
|---|---|---|---|---|
| 5,479,811 A | * | 1/1996 | Baumann et al. | 73/1.37 |
| 5,829,847 A | * | 11/1998 | Tozu et al. | 303/167 |
| 6,611,781 B1 | * | 8/2003 | Gutmann | 702/148 |
| 7,340,380 B2 | * | 3/2008 | Klotz et al. | 702/189 |
| 2004/0153216 A1 | * | 8/2004 | Tan | 701/1 |

FOREIGN PATENT DOCUMENTS

| | | | |
|---|---|---|---|
| EP | 0230745 A2 | * | 12/1986 |
| EP | 1674362 A1 | * | 6/2006 |
| EP | 1806256 A1 | * | 7/2007 |
| EP | 1816045 A1 | * | 8/2007 |
| EP | 2187223 A1 | * | 5/2010 |
| GB | 2385671 A | * | 8/2003 |

* cited by examiner

*Primary Examiner* — Thomas Black
*Assistant Examiner* — Sara Lewandroski
(74) *Attorney, Agent, or Firm* — Ingrassia Fisher & Lorenz, P.C.

(57) ABSTRACT

A method of estimating a speed of a vehicle is provided. The vehicle has a wheel and the method comprises receiving a first wheel speed signal indicating a rotation rate of the wheel, determining a first calculated forward speed of the vehicle based on the first wheel speed signal, receiving a first steering signal, determining the first steering signal contains information indicating large steering activity, receiving a second wheel speed signal at a later time than the first wheel speed signal, and determining, in response to receiving the first steering signal, a second calculated forward speed of the vehicle that is based on the second wheel speed signal and the first calculated forward speed.

8 Claims, 3 Drawing Sheets

MULTI-FACTOR SPEED ESTIMATION SYSTEM AND METHOD FOR USE

TECHNICAL FIELD

Embodiments of the subject matter described herein relate generally to estimating the speed of a vehicle. More particularly, embodiments of the subject matter relate to estimating the speed of a vehicle by weighting inputs under different driving conditions.

BACKGROUND

Vehicles typically include at least one electronic control module (ECM) that performs a wide variety of functions in assisting an operator of the vehicle in controlling the vehicle. The ECM is typically connected to a large number of sensors throughout the vehicle as well as numerous actuators. With the sensors, the ECM can determine certain information about the state of the vehicle. With the actuators, the ECM can affect the operation of the vehicle. For example, the ECM can detect heavy braking by the operator of the vehicle via a brake pedal sensor and, in response, operate the anti-lock features of the braking system.

Some of the functions performed by the ECM require or benefit from information regarding the speed of the vehicle. The speed of the vehicle can be difficult to determine precisely, however, as a speed calculation might rely on data from several different sources, any of which can be confounded during certain circumstances. For example, a wheel sensor may detect the rotational rate of the wheel. Together with information regarding the geometry of the wheel, a rate of speed for travel of the vehicle can be determined. In certain circumstances, however, the wheel may be moving independently of the vehicle's travelling speed, such as while slipping on a surface, or locked in a stopped position during a skid. In addition, during aggressive turning maneuvers, the vehicle can experiences a heavy steering and/or plowing condition, resulting in a large speed differential between wheel speeds and the vehicle's speed. Consequently, measures of the vehicle's speed which rely on wheel speeds are adversely affecting. Accordingly, estimates of the vehicle's speed that depend solely on the wheel speed can be unreliable. Similarly, accelerometers and/or transmission speed sensors can be unreliable in certain circumstances.

Although certain sensors are not helpful in determining the vehicle's speed under various circumstances, they can be used effectively during others. Accordingly, it is important to determine under what conditions the information from a specific sensor should be relied on, and when it should not. Additionally, the ECM always estimates a vehicle's speed, even when a sensor is unreliable. Accordingly, basing the estimation on a number of sensors is desirable.

BRIEF SUMMARY

A method of estimating a speed of a vehicle is provided. The vehicle has a wheel and the method comprises receiving a first wheel speed signal indicating a rotation rate of the wheel, determining a first calculated forward speed of the vehicle based on the first wheel speed signal, receiving a first steering signal, determining the first steering signal contains information indicating large steering activity, receiving a second wheel speed signal at a later time than the first wheel speed signal, and determining, in response to receiving the first steering signal, a second calculated forward speed of the vehicle that is based on the second wheel speed signal and the first calculated forward speed.

Another method of estimating a forward speed of a vehicle is provided. The method comprises determining the vehicle is in a heavy steering state, calculating a steering weight factor in response to determining the heavy steering state, determining the vehicle is in a plowing state, calculating a plowing weight factor in response to determining the plowing state, receiving wheel speed information, and calculating a vehicle speed based upon the wheel speed information, the steering weight factor, and the plowing weight factor.

A speed estimation system for a vehicle also is provided. The vehicle has a plurality of wheels and a steering wheel. The system comprises a plurality of wheel sensors, each wheel sensor coupled to a respective one of the plurality of wheels and adapted to detect a rotation rate of the wheel to which it is coupled, a steering sensor adapted to detect a yaw rate of the steering wheel, and a processing architecture coupled to the steering sensor and to each of the plurality of wheel sensors. The processing architecture is adapted to receive a plurality of wheel speed signals from the wheel sensors, each wheel speed signal indicating the rotation rate of the wheel to which the wheel sensor is coupled, to receive a steering signal indicating the yaw rate of the steering sensor, to determine a first condition of the vehicle from the wheel speed signals and the steering signal, and to calculate a first speed of the vehicle based on the first condition of the vehicle and the plurality of wheel speed signals.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
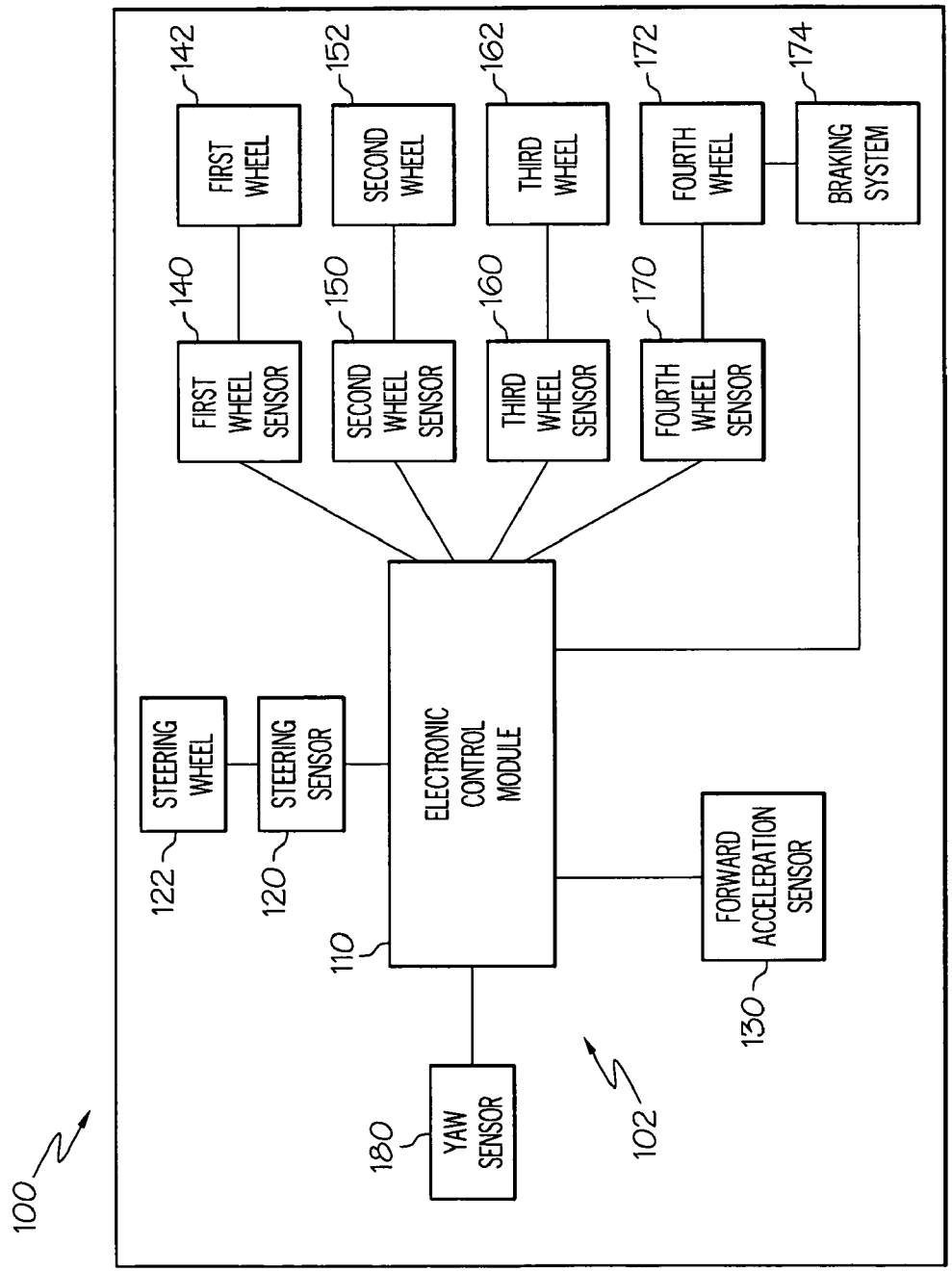
FIG. 1 is a schematic illustration of an embodiment of a vehicle with a multi-factor speed estimation system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional with reference to symbolic representations of operations, processing tasks, and functions that they may perform. In practice, one or more processor devices can carry out the described operations, tasks, and functions. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

FIG. 1 illustrates a schematic embodiment of a vehicle 100 with a multi-factor speed estimation system 102. The speed estimation system 102 can comprise an electronic control module (ECM) 110, a steering sensor 120, a forward acceleration sensor 130, and four wheel sensors 140, 150, 160, 170. The steering sensor 120 is preferably coupled to a steering wheel 122 of the vehicle 100. The forward acceleration sensor 130 is preferably capable of detecting the acceleration of the vehicle 100 in a longitudinal direction. Each wheel sensor 140, 150, 160, 170 can be coupled to a respective wheel 142, 152, 162, 172 of the vehicle 100. The wheels 142, 152, 162, 172 can each be coupled to a braking assembly or apparatus, such as representative braking system 174. The braking system 174 is coupled to the ECM 110, which can adjust its operation. The vehicle 100 can also comprise a yaw sensor 180 coupled to the ECM 110.

The ECM 110 can be configured as described below to perform a variety of tasks to estimate the forward speed of the vehicle 100. The ECM 110 can perform operations which filter sensor input based on the changing conditions under which the vehicle 100 is being operated. The ECM 110 can further be configured to weight more heavily past sensor readings during periods of rapidly changing sensor input values. Accordingly, the ECM 110 can rely on a plurality of inputs, conditional filters, and weights to estimate the speed of the vehicle more accurately than single-source estimations. Therefore, the ECM 110 can operate other aspects of the vehicle 100, such as the braking system 174 more effectively than an ECM which uses less accurate speed estimation techniques.

The ECM 110 preferably includes or cooperates with a system controller that is coupled to the various sensors spread through the vehicle 100. The ECM 110 can receive input from the sensors, including those indicative of the vehicle's state, as well as sensors providing input regarding operational decisions and commands from the operator, such as rotation of the steering wheel 122. The ECM 110 can evaluate the input received and, if appropriate to improve the stability and predictable operation of the vehicle 100, respond in a variety of ways.

For example, in response to detecting heavy steering activity via the steering sensor 120, the ECM 110 can adjust the operation of the braking system 174 to prevent loss of control of the vehicle. Additionally, the ECM 110 can perform some or all of the described operations itself, or can cooperate with another controller of the vehicle 100. For example, the ECM 110 can receive sensor data directly, or in certain embodiments, a separate controller component can receive the sensor data and relay it to the ECM 110. Thus, while some computation and evaluation functions are described as being performed by the ECM 110, they also can be performed by a separate component, and the results provided to the ECM 110 for action to be taken, depending on the results. Accordingly, while computation and comparison steps or methods may be described in relation to the ECM 110, the ECM 110 can, in various embodiments, perform all, some, or none of the steps, while still performing operations in response to the computations or comparisons produced.

Additionally, the ECM 110 can be comprised of one or more processor-based devices, which may be physically integrated into a single component or circuit board. In certain embodiments, the ECM 110 can be distributed throughout the electronic and/or computing architecture of the vehicle 100, including integration with components performing additional functions.

The steering wheel 122 is representative of a steering mechanism, and can be embodied in different forms for different vehicles, if desired. The steering wheel 122 is preferably coupled to a steering sensor 120. The steering sensor 120 is any sensor capable of detecting the rotational position of the steering wheel 122 or, equivalently, a rotating link, actuator, or component that rotates in response to changes in the position of the steering wheel 122. Preferably, the steering sensor 120 is also capable of detecting the rotational speed of the steering wheel 122, in any suitable measure, such as degrees per second, rotations per second, and so on. The steering sensor 120 can comprise, for example, a potentiometer coupled to the steering wheel 122 and/or steering column of the vehicle 100. Rotation of the steering wheel 122 can be detected continuously by the steering sensor 120, which can supply information regarding both the rotational speed of the steering wheel 122 as well as the position of the steering wheel 122 to the ECM 110.

The operator of the vehicle 100 is capable of creating a steered yaw rate by rotating the steering wheel 122. The steered yaw rate is defined as the desired yaw, or turning, or the vehicle 100 indicated by or otherwise derived from the amount of rotation of the steering wheel 122. For example, a steering wheel rotated 90° from a rest position represents a smaller steered yaw rate than a steering wheel rotated 270° from the rest position. The vehicle 100 preferably responds to the steered yaw rate by aligning the wheels 142, 152, 162, 172 to cause the vehicle 100 to travel at least partially to the side, thereby altering the direction of travel.

Where sensors are described throughout, they are described functionally. The input object from which the quantity being measured is received is used descriptively in the name, and should be understood that this information is derived from signals generated by the sensor in response to its detecting functions, regardless of where they are processed to determine the detected quantity. A rotation sensor, for example, will be described for exemplary purposes. The rotation sensor can generate a voltage which varies according to the rotational rate of the inspected object. In some embodiments, the rotation sensor can provide the voltage to another system, such as the ECM 110, which will perform operations to determine the acceleration to which the voltage level corresponds. In other embodiments, the rotation sensor can perform the operations internally. In such embodiments, the rotation sensor will provide a signal indicating the rotational rate directly, instead of the voltage level. In certain embodiments, the rotation sensor can provide both the signal indicating rotational rate, as well as the voltage to other components. Thus, for sensors described throughout, the sensor can perform in any of these modes, as appropriate and/or desired for the embodiment.

The vehicle 100 can comprise a forward acceleration sensor 130 coupled to the ECM 110. Preferably, the forward acceleration sensor 130 detects the acceleration of the vehicle in its longitudinal direction. The longitudinal direction for the vehicle 100 refers to its forward and reverse travel. Preferably, the sensor 130 can detect both the magnitude of longitudinal acceleration as well as the direction. Accordingly, though referred to as a "forward" acceleration sensor, the sensor 130 is capable of detecting backward acceleration as well, and can transmit information to the ECM 110 including both magnitude and direction. The forward acceleration sensor 130 can be of any suitable type, such as a piezoresistive accelerometer, as well as any other appropriate type, including microelectromechanical systems (MEMS) devices. The forward acceleration sensor 130 is preferably positioned and configured to detect acceleration of the vehicle 100 and supply information regarding the acceleration of the vehicle 100 to the ECM 110.

The wheels 142, 152, 162, 172 are of any size and/or type appropriate for use by the vehicle 100. A wheel sensor 140, 150, 160, 170 is preferably coupled to each wheel 142, 152, 162, 172. The wheel sensors 140, 150, 160, 170 can monitor the rotational rate of the wheel 142, 152, 162, 172 to which it is coupled. The wheel speed sensors 170 can transmit a signal indicating the rotational rate of the wheel 172, or wheel speed, or, in certain embodiments, provide the speed of the vehicle 100 as determined based upon the wheel speed. Thus, the wheel speed sensors 140, 150, 160, 170 can be of any type described previously, and preferably performs the described functions, although the physical embodiment can vary between embodiments of the vehicle 100.

Each wheel 142, 152, 162, 172 is preferably affected by a braking system, such as the illustrated braking system 174. Other braking systems can be present and coupled to the wheels 142, 152, 162, 172, but are omitted for clarity. The braking system 174 can be any type of braking system, such as a disc braking system, or a drum braking system. Preferably, the braking systems are uniform throughout the vehicle 100. Each braking system can be coupled to a wheel 142, 152, 162, 172, and can reduce the rotational speed of the wheel 142, 152, 162, 172 when operated. The braking system 174 can be operated by the driver of the vehicle 100, as well as by the ECM 110, to which the braking system 174 is coupled. The braking systems throughout the vehicle 100 can be independently operable.

The ECM 110 can adjust the operation of the braking system 174 to leave the driver's operation unchanged, to reduce the amount of braking force applied by the braking system 174 to below the amount normally resulting from the driver's operation, and to increase the amount of braking force applied by the braking system 174 to an amount greater than the amount normally resulting from the driver's operation. Accordingly, the ECM 110 can perform more sophisticated braking procedures than the driver can accomplish with the brake pedal.

The ECM 110 most effectively performs operations when it can determine the speed at which the vehicle is travelling. Determining the speed by estimation from various sources can be inaccurate. For example, a wheel speed sensor 140, 150, 160, 170 can be one source from which the speed of the vehicle 100 can be estimated through knowledge of the wheel's rotation rate. With certain geometric facts regarding the vehicle 100 and its wheels 142, 152, 162, 172, the rotation rate of the wheel can be converted to an estimate of the velocity of the vehicle 100. This method can be inaccurate because the rotation rate of a wheel 142, 152, 162, 172 can vary independent from the speed of the vehicle 100 in some circumstances, such as operation on slick surfaces.

The yaw sensor 180 is preferably a sensor adapted to determine the actual rate of change of angle of the vehicle 100 about a central axis. The actual yaw rate of the vehicle 100 can be different than the steered, commanded, or driver-indicated yaw rate, described above. The yaw sensor 180 can be physically offset from the center of the vehicle 100 and adjust its readings to compensate for the physical distance. The yaw sensor 180 can be an accelerometer, or any other type of sensor suitable to determine the rotation rate of the vehicle 100. Thus, although the yaw sensor 180 can be one of the sensor types described below, other sensor types can be used, without limitation. The yaw sensor 180 is preferably coupled to the ECM 110 such that it can provide information to the ECM 110.

Figure 2:
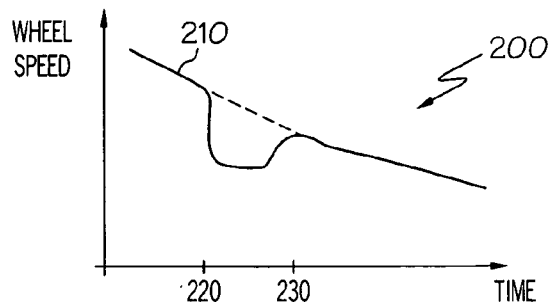
FIG. 2 is a graph of wheel speed versus time associated with certain vehicle operating conditions.

One method of estimating the speed of a vehicle 100 can assign weights to inputs in a preconfigured manner. By intelligently weighting the information from inputs, such as the wheel speed sensors 140, 150, 160, 170, more accurate speed estimates can be obtained. FIG. 2 illustrates a sample situation in which weights are assigned to an input signal.

In FIG. 2, a graph 200 is shown of the values of wheel speed for a of a sample wheel from a wheel speed sensor over time. Increasing values on the x axis indicate increasing time, while increasing values on the y axis indicate increasing wheel speed. As can be seen, the wheel speed 210 is generally decreasing with time. While the decrease is steady, at time 220, the value of wheel speed 210 falls sharply. The wheel speed value resumes, however, a value more closely matching the previous decreases at time 230. The graph 200 is representative of signals from a wheel speed sensor over time experiencing a driving condition, such as a plowing condition.

Thus, where a vehicle's speed is determined from the values of wheel speed from the wheel speed sensors, the wheel speed 210 over time indicates a steady decrease with a sharp drop, followed by a steep increase. It is more likely, however, that the wheel has experienced an incident reducing its effectiveness as a basis for overall vehicle speed. Such an incident could be a skid, wheel slip, traction-loss event, or other cause. Additionally, for a variety of reasons, the wheel sensor could intermittently transmit an incorrect value.

Regardless of the reason for the inconsistent reading, it is desirable for the ECM of the vehicle to continue to operate using an accurate estimation of the vehicle's speed. Accordingly, the ECM can weight differently values from the wheel speed sensor over time. For example, the ECM can use a moving average of detected wheel speed values. When the ECM determines a sharp change, whether increase or decrease in a wheel speed value from the previous detected wheel speed value, the ECM can assign a weight to the detected wheel speed values. In such a weighted average, the ECM can assign a higher weight to older values and a lower weight to newer values. This has the effect of minimizing the effects of large changes in detected wheel speeds on the estimated speed of the vehicle. Once the ECM begins to detect wheel speeds more consistent with, or closer in value to, the moving weighted average, it can assign a higher weight to newer values and a lower weight to older values.

The ECM can be configured to assign different weights based on the scale of the change in reading. For example, when a wheel speed value decreased by 50%, it can be assigned a weight of 0.1, whereas a wheel speed value decrease of 10% can be assigned a weight of 0.5. A wheel speed value that represents a decrease from a previous value of less than 1% can be assigned a weight of 1.0. Other scales can also be used, as desired, to reach a weight schedule appropriate for the embodiment. Notwithstanding the values of weights, the ECM can retain the information from, and use with greater confidence, wheel speed values consistent with previous wheel speed values during periods of large change.

In the event that the sharply-changed wheel speed values represent actual sharp changes in vehicle speed, as the ECM continues to calculate a moving average, the estimated values of vehicle and wheel speeds will decrease. Accordingly, the more recent, changed values will acquire greater weights until they are weighted more heavily than previously-high wheel speed values. Although described in the context of a wheel speed decrease, other changes can be accommodated by an ECM in a similar manner. Additionally, the weighting of temporal values of wheel speed can be used in conjunction with other techniques described below for accurate vehicle speed estimation.

FIG. 2 can also illustrate a method of determining an average vehicle speed over time. After determining a forward speed of the vehicle 100, the ECM 110 can assign a weight to known-good values of the forward speed higher than newer, changing values. In such a process, the ECM 110 first receives a wheel speed signal and calculates the forward speed of the vehicle 100 therefrom. The ECM 110 then records the calculated forward speed of the vehicle 100. Such a value would be one in FIG. 2 prior to time 220.

Certain events, such as a heavy steering event described above, can indicate to the ECM 110 that the speed of the vehicle 100 might be changing substantially, affecting the ECM's 110 operation of the braking system 174. For example, when the steered yaw rate, as measured by the steering sensor 120 exceeds a first threshold steered yaw rate, the ECM 110 can determine a heavy steering event exists. The ECM 110 can then repeat the sequence with a new wheel speed signal, determining a new forward speed of the vehicle 100. Such a determination would occur between times 220 and 230 in FIG. 2. Because the heavy steering event can cause unreliable estimations of vehicle speed from wheel speed signals, the ECM 110 can assign weights to both the recorded calculated forward speed and the newly-calculated forward speed, and calculate an average speed.

In such a circumstance, the ECM 110 preferably determines a forward speed of the vehicle 100 reflecting a greater weight to a previous speed value that was not calculated during the heavy steering event. Weight values can be assigned according to the configuration of the ECM 110, which can vary between embodiments. The weight of the values in a single embodiment can additionally vary based on the type of event detected, such as a plowing event or spin event described below. Additionally, the weight values can vary depending on the change between sequential calculated speed values. Thus, small changes can result in a greater weight for newly-calculated vehicle speed values while a smaller weight can be assigned to those vehicle speed values which represent a large change from previous values.

After a signal from the steering sensor 120 indicates that the steered yaw rate of the vehicle 100 has reduced below a second threshold steered yaw rate, the ECM 110 can determine that the heavy steering event is over. The second threshold steered yaw rate can be greater or less than the first threshold steered yaw rate, as configured for the embodiment. The ECM 110 can again calculate the estimated speed of the vehicle 100, which would occur during a time after time 230 in FIG. 2. When calculating an estimated speed for the vehicle 100, the ECM 110 can again assign weights to previously-recorded and newly-calculated values. The ECM 110 now preferably assigns a lesser weight to the recorded value, which reflects a speed calculated between times 220 and 230 in FIG. 2. Additionally, the ECM 110 preferably assigns a greater weight to the newly-calculated value occurring after time 230, after the heavy steering event has ended. Consequently, a more reliable estimated speed is assigned a higher weight.

Before, during, and after the heavy steering event, the ECM 110 can use the estimated speed of the vehicle 100 it calculates to adjust its operation of the braking system 174. For example, during the heavy steering event, the ECM 110 can increase the braking force applied by the braking system 174. The increased braking force can be bounded by a desired rate of slowing of the vehicle 100. If the vehicle 100 is slowing too rapidly as based on the calculated estimated vehicle speed, the ECM 110 can reduce the braking force. If, however, the vehicle 100 is not slowing rapidly enough, the ECM 110 can increase the braking force, and possibly operate an anti-lock braking feature, if applicable. Accordingly, the ECM 110 adjusts its operation of the braking system 174 in response to the calculated values of estimated vehicle speed.

Figure 3:
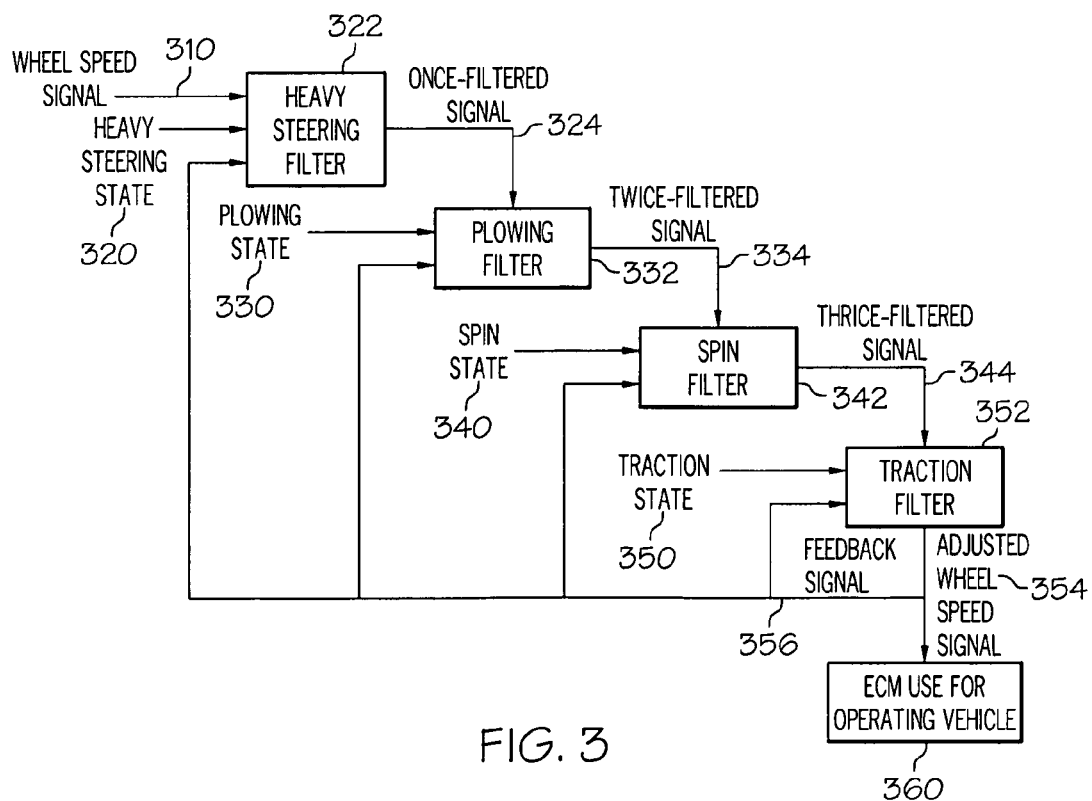
FIG. 3 is a schematic of an exemplary filtering arrangement suitable for use with an embodiment of an electronic control module.

FIG. 3 illustrates an exemplary embodiment of a filtering technique for determining an accurate vehicle speed estimate when provided with information from a variety of sources. The components of vehicle 100 are used for illustrative purposes. Other components, sensors, systems, and methods of determination can be used in the cascading filtering technique shown in FIG. 3, as appropriate to the embodiment. The ECM 110 can perform some or all of the illustrated filtering steps as prompted by signals from the sensors of the vehicle 100. Thus, the filters shown do not need to be physical components, but can represent a sequence of operations performed by the ECM 110. Though illustrated as components, the various filter blocks shown in FIG. 3 illustrate operational functions, and can be performed by the ECM 110 or other subcomponents as appropriate.

The ECM 110 can receive a wheel speed signal 310 from one of the wheel speed sensors 140, 150, 160, 170. From the wheel speed signal 310, the ECM can calculate an estimate of the speed of the vehicle, such as a simple average of the vehicle's speed as indicated by the speed of the wheel 142, 152, 162, 172 to which the sensor is coupled. Other calculation techniques can also be used.

The ECM 110 can additionally determine certain states of the vehicle 100, such as a heavy steering state 320, a plowing state 330, a spin state 340, and a traction state 350, among others. Each state 320, 330, 340, 350 can be determined based on inputs from various sensors to the ECM 110. For example, the ECM 110 can determine the vehicle 100 is in a heavy steering state 320 when the steered yaw rate described above exceeds a certain predetermined steered yaw rate. Thus, if a heavy steering state 320 is configured to exist when the steered yaw rate exceeds 20°/second, and the ECM 110 receives signals from the steering sensor 120 indicating a steered yaw rate of 25°/second, the ECM 110 can determine the vehicle 100 is in a heavy steering state 320. The heavy steering state 320 can end when the steered yaw rate drops below a second predetermined steered yaw rate. The second predetermined steered yaw rate can be the same as the first predetermined steered yaw rate, or higher or lower, as configured to the embodiment.

When the ECM 110 determines the vehicle 100 is in a heavy steering state 320, the values of wheel speed from the wheel speed sensors 140, 150, 160, 170 can be subjected to filtering by a heavy steering filter 322. The heavy steering filter 322 can perform operations on the wheel speed signal 310 to adjust it in a desired way. For example, the heavy steering filter 322 can be a high-pass filter, a low-pass filter, or any other type desired.

Preferably, the heavy steering filter 322 is configured or selected to remove portions of the wheel speed signal 310 unlikely to reflect accurate measures of the vehicle speed. For example, during a heavy steering state 320 or condition, signals from the front wheel sensors may be known to register a lower wheel speed than the vehicle's speed. For this reason, the heavy steering filter 322 can remove contributions to the wheel speed signals from the front wheels, or can weight them lower than signals from the rear wheel.

The heavy steering filter 322 can further incorporate information from a feedback signal 356 described in more detail below. As one example, the weights assigned to certain values can be determined, at least in part, from information contained in the feedback signal 356. For example, as described above in reference to FIG. 2, when the ECM 110 determines that a sharp change in sensor values is occurring, it can assign a higher weight to older values as part of its calculations. Similarly, the heavy steering filter 322 can perform some operations differently by incorporating information from the feedback signal 356. Filtering by the heavy steering filter 322 can also be embodied by the calculation of a heavy steering weight factor by which the wheel speed signal 310 is adjusted. Thus, in addition to additions or deletions to the wheel speed signal 310, filtering can comprise the calculation of a weight factor.

After performing filtering operations, the heavy steering filter 322 can transmit a signal called the once-filtered signal 324. When the vehicle 100 is not in a heavy steering state, the heavy steering filter 322 can perform no filtering operations and the once-filtered signal 324 can be unaltered from the wheel speed signal 310.

The once-filtered signal 324 can be provided to a plowing filter 332. In a manner similar to that described above, the ECM 110 can determine whether the vehicle 100 is in a plowing condition or plowing state 330. The criteria for a plowing state can include wheel speeds, braking rates, steered yaw rate, a differential between wheel speeds, and other indicators of the state of the vehicle 100. For example, when a brake sensor coupled to a brake pedal or braking system 174 indicates heavy braking during high steering activity at a time when wheel speeds change out of proportion to the braking amount, the ECM 110 can determine the vehicle 100 is in a plowing state 330. As another example, when the differential between rotation rates of two different wheels is determined to be greater than a predetermined differential, the ECM 110 can determine the vehicle 100 is in a plowing state 330.

If the vehicle 100 is determined to be in a plowing state 330, the plowing filter 332 can perform filtering operations designed to improve the accuracy of the once-filtered signal 324 by addressing plowing-specific features of the wheel speed signal 310. As described above, the plowing filter 332 can be any desired type of filter configured to produce the twice-filtered signal 334, including a calculation of a plowing weight factor. The feedback signal 356 can be used to operate the plowing filter 332 as well. In the event that the vehicle 100 is not in a plowing state 330, the plowing filter 332 can transmit the once-filtered signal 324 as the twice-filtered signal 334, unaltered.

The twice-filtered signal 334 is then provided to a spin filter 342. The vehicle 100 can be in a spin state 340. The spin state 340 can be determined by the ECM 110 after evaluating inputs from sensors, including the yaw sensor 180. When the rotation rate of the vehicle 100 around a central axis exceeds a certain, predetermined rate, as detected by the yaw sensor 180, the ECM 110 can determine the vehicle 100 is in a spin condition or spin state 340.

When the vehicle 100 is in a spin state 340, the spin filter 342 can adjust the twice-filtered signal 334 to make speed estimates based upon it more accurate. The spin filter 342 can filter out portions of the twice-adjusted signal 334 which contain information likely to be the result of the spin state 340 and not useful for determining the speed of the vehicle 100. For example, a wheel speed sensor for a rear wheel might provide an anomalously low reading during a spin state 340. Consequently, the spin filter 342 can reduce the weight associated with the signal from the rear wheels, such as by calculating a spin weight factor by which to adjust the twice-adjusted signal 334. Alternatively, the spin filter 342 can perform other filtering operations, such as low- or high-pass filtering, notch filtering, and so on, in a manner similar to the other filters 322, 332, 352. If the vehicle 100 is not determined to be in a spin state 340, the spin filter 342 can transmit the twice-filtered signal 334 unaltered as the thrice-filtered signal 344.

The thrice-filtered signal 344 can then be provided to a traction filter 352. The traction filter 352 can perform operations on the thrice-filtered signal 344 when the ECM 110 determines the vehicle 100 is in a traction condition or traction state 350. The ECM 110 can determine a traction state 350 exists when signals from a variety of sensors to which the ECM 110 is coupled.

One example of a traction state 350 can be when a wheel speed sensor indicates a rotation rate that greatly exceeds either the rotation rates of all the other wheels, or previous values that would be consistent with the estimated speed of the vehicle 100. Thus, where one wheel is free-spinning, the contribution of the attached wheel speed sensor should be minimized when estimating the speed of the vehicle 100. The ECM 110 can determine the vehicle 100 is in a traction state 350, which can apply the traction filter 352 to more accurately interpret the signals from the wheel speed sensors. Similarly, if the signal values from a wheel vary significantly over a short period of time from previous signal values that were consistent with the estimated speed of the vehicle 100, the ECM 110 can determine that a traction state 350 exists.

The ECM 110 can also use information from the forward acceleration sensor 130 to determine if the vehicle 100 is in a traction state 350. For example, if all wheel speed sensors 140, 150, 160, 170 transmit signals indicating rapidly increasing wheel speeds while a signal from the forward acceleration sensor 130 indicates no large change in acceleration of the vehicle 100, the ECM 110 might determine the vehicle 100 is in a traction state 350. The exact parameters and thresholds for such a determination can be configured for each ECM 110 and can vary between embodiments.

After determining at traction state 350 exists, the ECM 110 can apply the traction filter 352, which can further modify the thrice-filtered signal 344. The traction filter 352 can perform operations containing information from the feedback signal 356. Preferably, the traction filter 352 adjusts the thrice-filtered signal 344 in a manner similar to the previous filters, except configured to specifically alter portions of the signal which might be influenced by the traction state 350. One such technique can be the calculation of a traction weight factor, which can be based on the feedback signal 356, as well as other sources. As mentioned above, any type of operation or combination thereof can be performed by the traction filter 352. The output of the traction filter 352 is an adjusted wheel speed signal 354, which can be the direct result of operations performed by the traction filter 352, or can be obtained after additional operations omitted here for clarity. Additionally, in the appropriate embodiments, the adjusted wheel speed signal 354 can be the result of application of relevant calculated weight factors to the original wheel speed signal 310.

The adjusted wheel speed signal 354 is the result of processing by the traction filter 352 not because of any specific operation performed by the traction filter 352, but rather because it is the final filtering device in the sample filter assembly illustrated in FIG. 3. Accordingly, if the plowing filter 332 were the final filter in an embodiment of such an assembly, the adjusted wheel speed signal 354 would be the result of operations performed by the plowing filter 332, including subsequent non-filtering calculations, and not the traction filter 352.

The adjusted wheel speed signal 354 can then be used to determine an estimated speed of the vehicle 100 with greater accuracy than the wheel speed signal 310. It should be noted that the signals from multiple wheel speed sensors each can be processed through a filter arrangement like the exemplary embodiment in FIG. 3. Thus, where FIG. 3 describes one or more signals as a part of the processing technique, it should be understood that one or more signals can be processed singly or together in different embodiments.

In addition to the schematic shown in FIG. 3, different filters can also be used in place of, or in addition to, the filters shown. Additionally, different arrangements of filters can also be used, such as a heavy acceleration filter or heavy braking filter. The layout shown in FIG. 3 is one embodiment, of which many can be formed using different combinations and sequences of filters.

Figure 4:
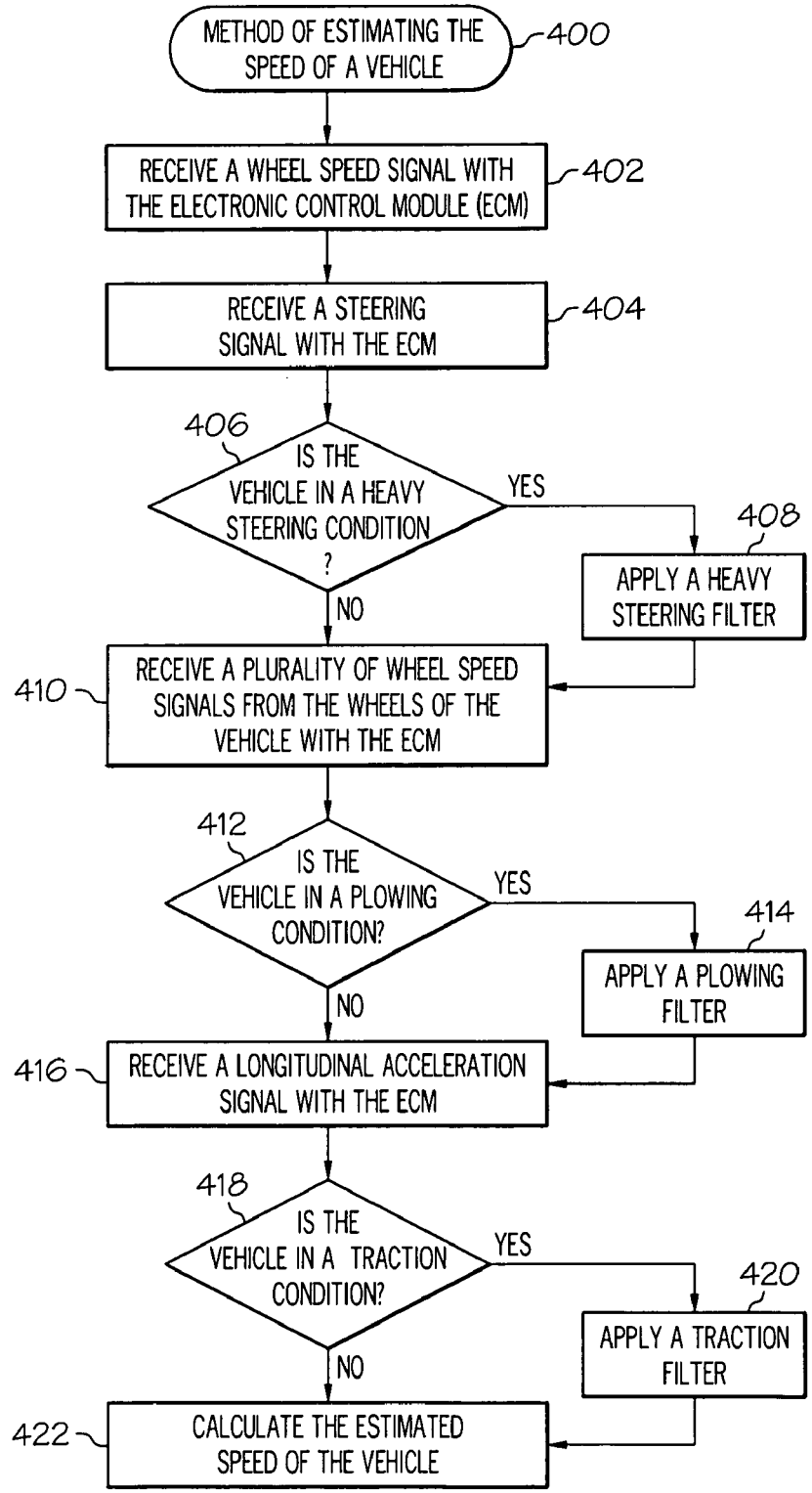
FIG. 4 is a schematic illustration of a method of estimating the speed of a vehicle using a multi-factor speed estimation system.

FIG. 4 illustrates a method 400 of estimating the speed of a vehicle using some of the previously-described techniques. The various tasks performed in connection with method 400 may be performed by software, hardware, firmware, or any combination thereof. For illustrative purposes, the following description of method 400 may refer to elements mentioned above in connection with FIGS. 1-3. In practice, portions of method 400 may be performed by different elements of the described system, e.g., ECM 110, steering sensor 120, or first wheel sensor 140. It should be appreciated that method 400 may include any number of additional or alternative tasks, the tasks shown in FIG. 4 need not be performed in the illustrated order, and method 400 may be incorporated into a more comprehensive procedure or process having additional functionality not described in detail herein.

To estimate a vehicle speed with accuracy using a multi-factor technique, a wheel speed signal is first received by the ECM 110 (task 402). The wheel speed signal can then be evaluated in sequence through a plurality of filters based on the conditions under which the vehicle 100 is operating. Although presented in a certain order here, it should be understood that any order desired for an embodiment can be used, with more or fewer filters as appropriate.

The ECM 110 can rely on signals from sensors in the vehicle 100 for information regarding the operating conditions of the vehicle 100. For the first illustrated filter, the ECM 110 can receive a signal from a steering sensor 120. From the steering sensor signal, the ECM 110 can determine whether the vehicle 100 is in a heavy steering condition (task 406). In the event that the ECM 110 determines a heavy steering condition exists, it can apply a heavy steering filter to the wheel speed signal (task 408). The ECM 110 can then use the filtered signal for future operations. If no heavy steering condition exists, the ECM 110 can advance to the next step in the sequence without filtering the wheel speed signal.

It should be understood that while applying the heavy steering filter (task 408), the ECM 110 can perform a plurality of operations, as described above. Additionally, some of the operations can include operations similar to those described in reference to FIG. 2, wherein values over time are weighted differently to produce a more accurate estimate of vehicle speed.

The ECM 110 can also receive a plurality of wheel speed signals from wheel speed sensors 140, 150, 160, 170 coupled to the wheels of the vehicle 100 (task 410). These signals can be received independently to and in addition to the initial signal of task 402. Examination of the plurality of signals, together with information from the steering sensor 120 can allow the ECM 110, to determine whether the vehicle 100 is in a plowing condition (task 412).

If the ECM 110 determines the vehicle 100 is in a plowing condition, the ECM 110 can apply a plowing filter (task 414) to the signal. To restate for clarity, if the vehicle 100 was not in a heavy steering condition, the plowing filter will be applied to a previously unadjusted signal. If the vehicle was in a heavy steering condition, the plowing filter will be applied to a signal which has already had a heavy steering filter applied to it. If the vehicle 100 is not in a plowing condition, the ECM 110 will not apply the plowing filter.

Subsequently, the ECM 110 can receive a signal from the forward acceleration sensor 130 (task 416). With information from the forward acceleration sensor 130, the ECM 110 can determine if the vehicle 100 is in a traction condition (task 418). In the event that the vehicle 100 is in a traction condition, the ECM 110 can then apply a traction filter to the wheel speed signal (task 420). If no traction condition exists, the ECM 110 can omit the traction filter. Subsequently, the ECM 110 can perform other calculations described above to estimate the speed of the vehicle 100 from the filtered wheel speed signal (task 422). If the ECM 110 did not determine the vehicle 100 was in a heavy steering condition, a plowing condition, or a traction condition, the signal received in task 402 would be used for the calculation task 422 without alteration. As described with respect to FIG. 3 above, different filters and/or ordering can be used as desired for the embodiment.

In addition to the illustrated steps, the ECM 110 can continuously monitor the different sensors distributed throughout the vehicle 100. Accordingly, while certain sensors are described as providing information at various points throughout method 400, in practice the ECM 110 can receive information from the sensors continuously, or as often as desired, including all sensors to which the ECM 110 is coupled. Thus, although not all sensors are individually identified, or some are identified as providing a signal to the ECM 110 at a certain time, the ECM 110 can receive signals from any or all of the sensors of the vehicle 100 at whatever rate for which the embodiment of the speed estimation system 102 is configured.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of estimating a forward speed of a vehicle, the method comprising:
    determining the vehicle is in a heavy steering state;
    calculating a steering weight factor in response to determining the heavy steering state;
    determining the vehicle is in a plowing state;
    calculating a plowing weight factor in response to determining the plowing state;
    receiving wheel speed information;
    filtering the wheel speed information using the steering weight factor, to obtain once-filtered wheel speed information;
    filtering the once-filtered wheel speed information using the plowing weight factor, to obtain twice-filtered wheel speed information; and
    calculating a vehicle speed based upon the twice-filtered wheel speed information.

2. The method of claim 1, further comprising:
    determining the vehicle is in a traction state;
    calculating a fraction weight factor in response to determining the plowing state; and
    wherein calculating the vehicle speed comprises calculating the vehicle speed based upon the twice-filtered wheel speed information and the traction weight factor.

3. The method of claim 1, wherein the vehicle further comprises a braking system and the method further comprises adjusting operation of the braking system based on the vehicle speed.

4. A speed estimation system for a vehicle having a plurality of wheels and a steering wheel, the system comprising:
    a plurality of sensors to provide information regarding operating conditions of the vehicle, the plurality of sensors comprising a plurality of wheel sensors, each wheel sensor coupled to a respective one of the plurality of wheels and adapted to detect a rotation rate of the wheel to which it is coupled; and
    a processing architecture coupled to the plurality of sensors, including each of the plurality of wheel sensors, the processing architecture adapted to:
        receive a plurality of sensor signals from the plurality of sensors, the plurality of sensor signals comprising wheel speed signals from the wheel sensors, each wheel speed signal indicating the rotation rate of the wheel to which the wheel sensor is coupled;
        determine an operating condition of the vehicle from the plurality of sensor signals, including the wheel speed signals, wherein the operating condition causes unreliable estimations of vehicle speed from the wheel speed signals;
        in response to determining the operating condition of the vehicle, obtaining a weighted moving average of detected wheel speed values associated with the wheel speed signals, wherein the processing architecture calculates the weighted moving average by assigning higher weight to older detected wheel speed values and lower weight to newer detected wheel speed values until the wheel speed signals indicate wheel speed values that are closer to the weighted moving average;
        when the wheel speed signals indicate wheel speeds values consistent with the weighted moving average, the processing architecture calculates the weighted moving average by assigning higher weight to newer detected wheel speed values and lower weight to older detected wheel speed values; and
        calculate a speed of the vehicle based on the weighted moving average.

5. The system of claim 4, wherein the plurality of sensors further comprises:
    a forward acceleration sensor adapted to detect the acceleration rate of the vehicle, the forward acceleration sensor coupled to the processing architecture; and
    a yaw sensor adapted to detect the rotation rate of the vehicle about a central axis, the yaw sensor coupled to the processing architecture.

6. The system of claim 4, wherein the vehicle further comprises a braking system coupled to a wheel, and the processing architecture is further adapted to adjust operation of the braking system based on the speed of the vehicle.

7. A method of estimating a speed of a vehicle, the vehicle comprising a plurality of wheels, a plurality of wheel speed sensors coupled to the plurality of wheels, a steering wheel, a steering sensor coupled to the steering wheel, an acceleration sensor, and a yaw sensor, the method comprising:
    receiving a plurality of wheel speed signals from the plurality of wheel speed sensors, the plurality of wheel speed signals indicating respective rotation rates of the plurality of wheels;
    receiving a steering signal from the steering sensor, the steering signal indicating a yaw rate of the steering wheel;
    receiving a longitudinal acceleration signal from the acceleration sensor, the longitudinal acceleration signal indicating forward acceleration of the vehicle;

receiving a yaw sensor signal from the yaw sensor, the yaw sensor signal indicating a rotation rate of the vehicle about a central axis of the vehicle;

when the steering signal indicates a heavy steering condition, applying a heavy steering filter to the plurality of wheel speed signals to weight front wheel contributions to the plurality of wheel speed signals lower than rear wheel contributions to the plurality of wheel speed signals, to obtain once-filtered signals;

when a plowing condition of the vehicle is determined, applying a plowing filter to the once-filtered signals to address plowing-specific features of the once-filtered signals, and to obtain twice-filtered signals;

when the yaw sensor signal indicates a spin condition of the vehicle, applying a spin filter to the twice-filtered signals to filter out portions of the twice-filtered signals containing information not useful for determining speed of the vehicle, and to obtain thrice-filtered signals;

when a traction condition of the vehicle is determined, applying a traction filter to the thrice-filtered signals to alter portions of the thrice-filtered signals influenced by the traction condition, and to obtain adjusted wheel speed signals; and determining an estimated speed of the vehicle from the adjusted wheel speed signals.

8. The method of claim 7, wherein the vehicle further comprises a braking system and the method further comprises adjusting operation of the braking system in response to determining the estimated speed of the vehicle.

* * * * *